United States Patent [19]
Vermeulen et al.

[11] 3,828,472
[45] Aug. 13, 1974

[54] FLOWER ARRANGING ELEMENT
[75] Inventors: Johannes Anthonius Vermeulen, Herwijnen; Bernardus Adrianus Van Etten, Delft, both of Netherlands
[73] Assignee: Johannes Anthonius Vermeulen, Waaldijk, Herwijinen, Netherlands
[22] Filed: July 13, 1972
[21] Appl. No.: 271,528

[30] Foreign Application Priority Data
July 16, 1971 Netherlands .................... 7109879

[52] U.S. Cl. .................................. 47/41, 47/34
[51] Int. Cl. ................................... A01g 5/00
[58] Field of Search ............ 47/34, 41, 41.1, 41.11, 47/41.12, 41.13; 46/25; D34/15 FF, 15 GG; D35/3 A, 3 R; 248/176; 211/177

[56] References Cited
UNITED STATES PATENTS
| | | | |
|---|---|---|---|
| 1,074,239 | 9/1913 | Braun | 47/41 X |
| 2,563,202 | 8/1951 | Wurzlow | 47/41 |
| 2,799,972 | 7/1957 | Teixeina | 47/41 X |
| 2,881,562 | 4/1959 | Ragot | 47/41.13 |
| 2,908,112 | 10/1959 | Koistinen | 47/41.11 |
| 3,695,458 | 10/1972 | Nagel | 211/177 |

Primary Examiner—Robert E. Pulfrey
Assistant Examiner—Edward M. Coven
Attorney, Agent, or Firm—George F. Dvorak

[57] ABSTRACT

A flower arranging element according to the invention is provided by a body of stiff resilient plastics material consisting of two outwardly cylindrical members being joined to each other with their axes in parallel relationship by a linking piece lying in a plane extending at right angles to the axes of the members, one of the members having therein an open ended cylindrical cavity narrowing towards its open end and the other member being in the form of a cylindrical ring fitting closely around the cavity containing member of another element. The flower arranging element includes a flower stem holder being provided at its bottom end with a ball-shaped part capable of tight insertion into the cavity of the cavity carrying member and the flower stem holder being capable of receiving and supporting flower stems of different diameters.

4 Claims, 6 Drawing Figures

PATENTED AUG 13 1974 3,828,472

FLOWER ARRANGING ELEMENT

BRIEF SUMMARY OF THE INVENTION

This invention relates to flower arranging elements and has for its object to provide means whereby flowers may be arranged in different configurations.

Preferably the flower stem holder is provided with at least three upwardly extending and equi-angularly spaced teeth each having a longitudinally extending, inwardly directed knife-edged ridge, said ridges being capable gripping flower stem inserted into said holder.

Alternatively the part of the flower stem holder for receiving the flower stem is in the form of a vase widening upwardly from its bottom and having a cylindrical rim at its upper end, the sidewall of the widening portion being provided with a longitudinally extending narrow slit to enable water to enter the holder.

DETAILED DESCRIPTION OF THE INVENTION

Figure 1:
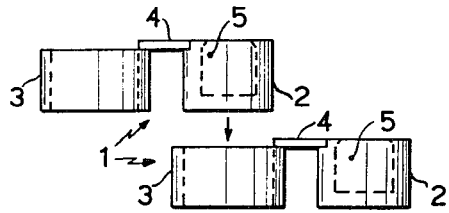
FIG. 1 is an exploded view of the bodies of two flower arranging elements according to the invention.
Figure 6:
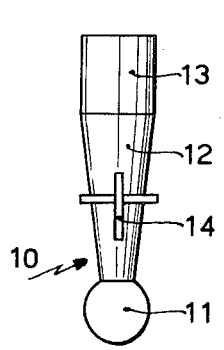
FIG. 6 is a side view to an enlarged scale of an alternative embodiment of the flower stem holder to be used with the flower arranging element according to the invention.
Figure 4:
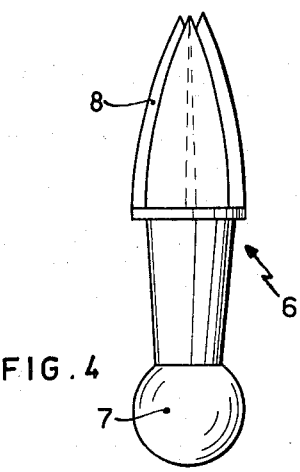
FIG. 4 is a side view, to an enlarged scale of the preferred embodiment of the flower stem holder to be used with the flower arranging element according to the invention.

Referring to the drawings the flower arranging element according to the invention consists of a body of stiff resilient plastics material such as, for example, polystyrene, in the form as shown in FIG. 1 and a flower stem holder of hard plastic, such as, for example nylon, being inserted into a part of said body and which may be in either one of the forms as shown in FIG. 4 and 6, respectively.

Figure 2:
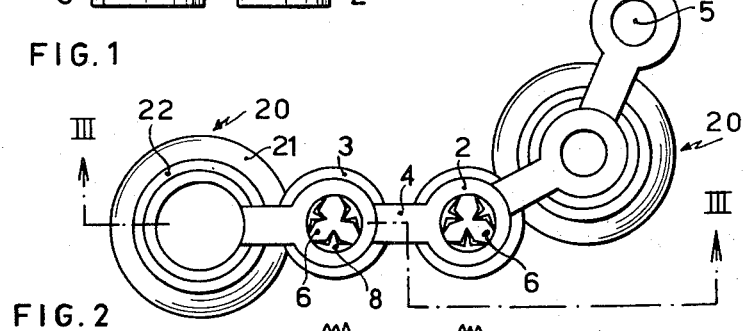
FIG. 2 is a plan view of four flower arranging elements according to the invention linked together to define a flower arranging chain.
Figure 3:
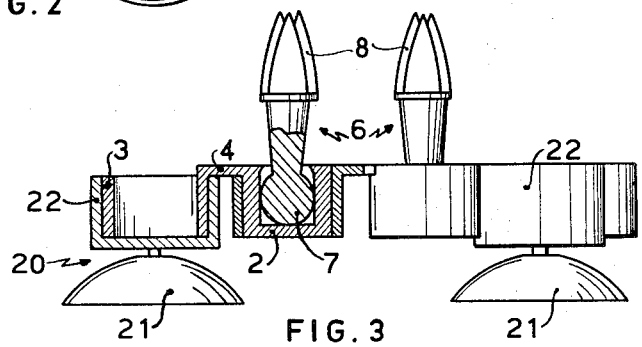
FIG. 3 is a view of the flower arranging chain shown in FIG. 2, the view being taken on the line III—III in FIG. 2.
Figure 5:
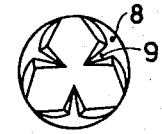
FIG. 5 is a plan view of the flower stem holder shown in FIG. 4.

The body 1 of each flower arranging element consists of two outwardly cylindrical members 2 and 3 which are joined to each other with their axes in parallel relationship by a linking piece 4 lying in a plane extending at right angles to the axes of these members. The member 2 of the body 1 is provided with an open ended cylindrical cavity 5 narrowing slightly towards its open end, while the member 3 of said body is in the form of a cylindrical ring the inner diameter of which is substantially equal to the outer diameter of the cavity containing member, so that this ring-shaped member will fit exactly around the cavity containing member 2 of another element. By inserting the cavity containing member 2 of one element into the cylindrical ring member 3 of another element, the elements can be connected together so as to form an articulated chain of arbitrary length. The manner in which the flower arranging elements may be fitted together is illustrated in FIG. 2 and FIG. 3 showing an articulated chain composed of four of such elements, two of which are provided with a flower stem holder 6 inserted into the cavity containing member thereof and which chain further is provided with two fastening devices 20 for mounting the same onto a support. The flower stem holder 6 as used with the chain according to FIG. 2 and FIG. 3 is shown to an enlarged scale in side view in FIG. 4 and in plan view in FIG. 5.

Said flower stem holder 6 is provided at its bottom end with a ball-shaped part 7 which as is shown in the cross-sectional view of FIG. 3 fits snugly into the cylindrical cavity 5 of the element body 1 and is retained into said cavity by the narrowing formed at the open end thereof. The holder 6 further is provided with three upwardly extending equi-angularly spaced teeth 8 each having a longitudinally extending inwardly directed knife-edged ridge 9, which ridges 9 will grip and hold flower stems of different diameters inserted into the holder. As will be apparent the number of teeth of the flower stem holder 6 is not limited to three as in the described embodiment but may be chosen larger, if desired.

Further, instead of the flower stem holder 6 a different type of flower stem holder as shown in FIG. 6 may be used with the elements.

This latter flower stem holder 10, like the holder 6 is provided at its bottom end with a ball-shaped part 11 fitting snugly into the cavity 5 of an element body 1 and further is in the form of a vase including a part 12 widening upwardly from its bottom and changing at its upper end into a cylindrical rim 13, the widening part 12 of said vase being provided in its side wall with a longitudinally extending narrow slit 14 to enable water to enter the holder.

The fastening devices 20 shown in FIG. 2 and FIG. 3 each consist of a suction pad 21 of supple elastic material, such for example as rubber or soft plastic and each being provided on the side opposite the suction face thereof with a collar member 22 closely fitting around the ring-shaped part 2 of an element body 1. The collar member 22 may be in the form of a cylindrical collar or a cup-shaped member, for example. Again it is observed that the fastening devices 20 are not limited to the particular embodiment shown in the drawings and for instance may be in the form of a suction pad having the collar member 22 formed as a whole therewith, the cylindrical wall of said member 22 then extending as a cylindrical collar on the upper side of said suction pad.

As may be apparent from FIG. 2, the flower arranging elements joined together into a chain may be mounted on a flat support under different angles with respect to each other, while the flower stem holders may be adjusted in the cavities so as to take different positions with respect to the supporting plane. This permits the arrangement of flowers in different positions one to another and the composition of arbitrary flower patterns in the form of letters, wreaths, garlands and the like.

What is claimed is:

1. A device for arranging flowers comprising a plurality of elements, each element being composed of a stiff resilient plastic material and including two parallel members having outer cylindrical surfaces and a linking piece connecting together one end of each of said cylindrical members so that the axes of said cylindrical members are in parallel spaced relation, said linking piece lying in a plane extending at right angles to the axes of the members, one of said members having therein a cylindrical cavity coaxial with the axis of said one member and narrowed at its open end adjacent said linking piece and the other member having an axial, cylindrical opening extending therethrough, the outer diameter of the one member of an element being substantially the same as the diameter of the cylindrical opening in the other member of said element whereby the one member of one element may be inserted into the other member of another element to form an articulated combination of a plurality of elements and further comprising at least one means for supporting at least one flower stem and having a substantially spherical member, the diameter of which is substantially the same as the diameter of the cylindrical cavity in said one member of each element for insertion therein, the narrowed open end of said cavity serving to releasably retain the flower supporting means in said cavity.

2. A device as claimed in claim 1 wherein the flower supporting means comprises at least three upwardly extending and equiangularly spaced teeth each having a longitudinally extending, inwardly directed knife-edged ridge, said ridges being capable of gripping a flower stem inserted into said supporting means.

3. A device as claimed in claim 1 wherein the flower supporting means comprises a vase member diverging upwardly from its bottom and having a cylindrical portion at its upper end, the side wall of the divergent portion being provided with a longitudinally extending slit to enable water to enter said vase member.

4. A device as claimed in claim 1 and further comprising means for fastening said device to a support and including a suction pad on one side for attachment to a support and on the other side, a cylindrical collar member for snugly receiving said other cylindrical member.

* * * * *